(12) United States Patent
Kostic

(10) Patent No.: US 8,744,457 B2
(45) Date of Patent: Jun. 3, 2014

(54) UNIQUE RADIO BEARER (RB) PROCEDURE

(75) Inventor: Srdjan Kostic, Stockholm (SE)

(73) Assignee: Unwired Planet, LLC, Reno, NV (US)

( * ) Notice: Subject to any disclaimer, the term of this patent is extended or adjusted under 35 U.S.C. 154(b) by 442 days.

(21) Appl. No.: 12/922,273

(22) PCT Filed: Apr. 17, 2008

(86) PCT No.: PCT/SE2008/050438
§ 371 (c)(1),
(2), (4) Date: Sep. 13, 2010

(87) PCT Pub. No.: WO2009/128754
PCT Pub. Date: Oct. 22, 2009

(65) Prior Publication Data
US 2011/0009124 A1    Jan. 13, 2011

(51) Int. Cl.
*H04W 72/00* (2009.01)
*H04W 4/00* (2009.01)

(52) U.S. Cl.
USPC ............................ 455/450; 370/329; 370/335

(58) Field of Classification Search
USPC ................................... 455/450; 370/335, 329
See application file for complete search history.

(56) References Cited

U.S. PATENT DOCUMENTS

| | | | | |
|---|---|---|---|---|
| 7,039,416 | B2 * | 5/2006 | Stumpert et al. | 455/450 |
| 7,644,410 | B1 * | 1/2010 | Graupner et al. | 718/104 |
| 7,853,258 | B2 * | 12/2010 | Xu et al. | 455/435.1 |
| 2003/0157953 | A1 * | 8/2003 | Das et al. | 455/522 |
| 2004/0052246 | A1 | 3/2004 | Jang | |
| 2004/0132455 | A1 * | 7/2004 | Stumpert et al. | 455/450 |
| 2005/0101298 | A1 * | 5/2005 | Norton et al. | 455/412.1 |
| 2005/0237933 | A1 * | 10/2005 | Marjelund et al. | 370/230 |
| 2006/0262723 | A1 * | 11/2006 | Velev et al. | 370/235 |
| 2007/0041343 | A1 * | 2/2007 | Barreto et al. | 370/329 |
| 2007/0123195 | A1 | 5/2007 | Ling et al. | |
| 2009/0129342 | A1 * | 5/2009 | Hwang et al. | 370/331 |
| 2010/0103852 | A1 * | 4/2010 | Jactat | 370/312 |
| 2011/0145319 | A1 * | 6/2011 | Dolan et al. | 709/203 |

FOREIGN PATENT DOCUMENTS

| WO | WO 2004/114590 A2 | 12/2004 |
|---|---|---|
| WO | WO 2004/114590 A3 | 12/2004 |

OTHER PUBLICATIONS

International Search Report, PCT/SE2008/050438, Feb. 12, 2009.
Supplementary European Search Report dated Dec. 23, 2013 in European Application No. EP 08 779 240.4.
European Communication with Examination Report dated Jan. 24, 2014 in EP Application No. EP 08 779 240.4.

* cited by examiner

*Primary Examiner* — Qun Shen
(74) *Attorney, Agent, or Firm* — Nixon & Vanderhye P.C.

(57) ABSTRACT

The present invention is related to a method for radio resource handling in a wireless communication network comprising the steps:—receiving via a transport network interface a request for assignment of one or more radio resources over an air interface of the wireless communication network;—transmitting via the air interface a radio resource assignment message for one or more one radio resources in the wireless communication network;—receiving a radio resource assignment confirmation message over the air interface;—transmitting a radio resource assignment confirmation message over the transport network interface, wherein the radio resource assignment message transmitted via the air interface comprises a single radio resource assignment message configured to simultaneously perform establishment, release and modification of one or more radio resources provided by over the air interface. This method may be implemented by a computer program comprising instruction sets for each method step. Also, the present invention comprises a radio base station and a mobile terminal where the method according to the present invention may be executed.

16 Claims, 4 Drawing Sheets

Fig. 1 – Prior Art
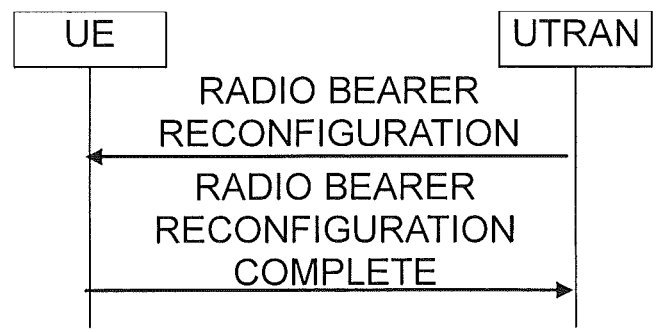
Fig. 2 – Prior Art
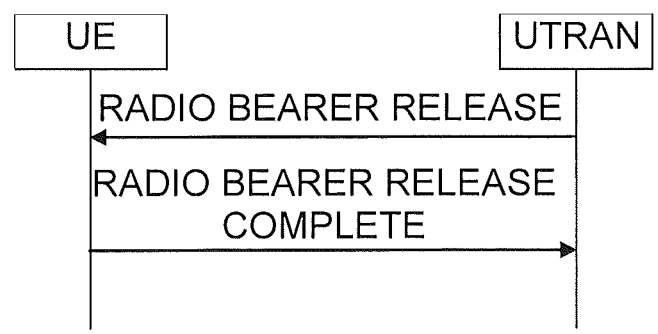
Fig. 3 – Prior Art

UNIQUE RADIO BEARER (RB) PROCEDURE

CROSS REFERENCE TO RELATED APPLICATION

This application is a 35 U.S.C. §371 national stage application of PCT International Application No. PCT/SE2008/050438, filed on 17 Apr. 2008, the disclosure and content of which is incorporated by reference herein in its entirety. The above-referenced PCT International Application was published in the English language as International Publication No. WO 2009/128754 A1 on 22 Oct. 2009.

TECHNICAL FIELD

The present invention is related to signaling in wireless radio communication networks. More specifically, the present invention deals with signaling when managing of radio bearers in a wireless communication network.

BACKGROUND OF THE INVENTION

In 2G and 3G wireless communication networks of today, such as in GSM (Global System for Mobile telephony, GPRS (General Packet Radio Service), WCDMA (Wideband Carrier Division Multiple Access), CDMA 2000 (Carrier Division Multiple Access) networks, each service based or Radio Access Bearer (RAB) based procedure from the Core Network (CN) is mapped to one or more specific Channel or Radio Bearer (RB) procedures over the air interface.

For example, in WCDMA systems the RAB Assignment procedure from the CN according to the RANAP (Radio Access Network Access Protocol) can be mapped to the RB Setup (due to RAB Setup-Establishment), and/or RB Release (due to RAB Release) and/or RB Reconfiguration (due to RAB Establishment or Release or RAB Modification) procedures in the RRC (Radio Resource Control) protocol towards UE (as Layer 3—L3 specification). Here, by layer 3 the network layer according to the OSI model is meant.

RAB assignment is done similarly in GPRS/EDGE (GPRS/Enhanced Data rates for Global Evolution) networks where there are few different layer-3-procedures, such as ADDITIONAL ASSIGNMENT (to add an additional dedicated channel), ASSIGNMENT COMMAND or CHANNEL MODE MODIFY (to modify existing dedicated channels), CHANNEL RELEASE (to release dedicated channels).

This means today a mobile terminal (UE) has to pass through a set of functions (establishment, release and reconfiguration of RBs) that are usually requested by one CN procedure as e.g. a RANAP RAB Assignment for WCDMA/HSPA (WCDMA/High-Speed Packet Access) networks. Each function presents a separate L3-message in radio control signaling, as it is done according to the RRC protocol. In most cases the separate L3 messages that handle RBs are actually separate procedures for the RAN (such as RAB Establishment with RB SETUP, RAB Release with RB RELEASE, RAB Modification—RB RECONFIGURATION). The signaling between the UTRAN and the UE in this case is illustrated in FIGS. 1-3.

The above mentioned radio functions or procedures are described in detail in 3GPP TS as 25.331 (RRC for WCDMA) or 04.18 (RRC for GSM/EDGE). Analogous or similar examples can be found in other existing mobile systems at the radio level, regardless whether they are 2G or 3G wireless communication network and also in new radio access technologies as LTE (Long Term Evolution), eHSPA (enhanced High Speed Packet Access), and some proposals for wireless communication networks of the fourth generation, i.e. 4G.

Even in the new systems, such as LTE, separate procedures for bearer handling are created via the application protocol between the CN and the RAN. Whereas separate messages are created for bearer setup, release and modification in the form of SAE BEARER SETUP, SAE BEARER RELEASE and SAE BEARER MODIFY in the S1AP (S1 Application Protocol), only one message or procedure RAB ASSIGNMENT REQUEST that is responsible for RABs setup, modify or release is used via RANAP in UTRAN, where RANAP is also an application protocol between CN and RAN.

In today's wireless communication networks where multiple APNs (Access Point Nodes) and multiple PDP contexts are active at the same time between the UE, the radio access part of the wireless communication network and CN, demands on the RAN to handle more than one RAB at the same time are rising. Especially by using so called "All IP"—solutions, multimedia services and IMS roadmaps, it is more likely for application clients in UEs and the service layer in CN to handle multiple RABs.

In these cases solutions provided by known technology may not give necessary flexibilities from the CN and RAN point of view.

In particular, the disadvantages of the solution according to known technology using "one procedure/function per radio control message" create on the one hand more signaling and increased node and UE processing over the CN-RAN (Iu) and the radio (Uu) interface). More specifically, in one solution for the UMTS wireless communication network, one CN requested procedure is handled as several RRC functions called RAN procedures and several RRC messages are sent towards UE.

On the other hand, this solution also leads to worse performance in the form of a longer setup, release and modify procedure and increases the delay before a RAB is established. As a consequence, a greater amount of messages over radio interfaces may lead to worse KPIs (Key Performance Indices) and therefore greater risk for the occurrence of Rice conditions or exceptional cases. By "Rice conditions" such conditions are meant where in a scenario where parallel request messages are transmitted from the RAN to one UE, the RAN may receive a response message to the second request before receiving the response message to the first request.

Even with new radio access technologies offering high throughput, such as LTE or eHSPA there are areas where the RAN performance can be improved.

These and other needs in known technology are addressed by the present invention.

SUMMARY OF THE INVENTION

One aspect of the present invention is related to a method for radio resource handling in a wireless communication network comprising the steps:
  receiving via a transport network interface a request for assignment of one or more radio resources over an air interface of the wireless communication network;
  transmitting via the air interface a radio resource assignment message for one or more one radio resources in the wireless communication network;
  receiving a radio resource assignment confirmation message over the air interface;
  transmitting a radio resource assignment confirmation message over the transport network interface, wherein the radio resource assignment message transmitted via the air interface comprises a single radio resource assignment message configured to simultaneously perform establishment, release and modification of one or more radio resources provided by over the air interface.

The introduction of the new single radio resource assignment message for establishment, release and modification will facilitate better handling of radio bearers (signaling and radio resource allocation) in the RAN as well as easier multi service interaction and multi RAB configuration deployments.

Moreover, the proposed new single radio resource assignment message or 'logic' for handling radio bearers in a generic way by means of one single message is applicable for any radio control protocol (L3 specification) standardized by 3GPP or 3GPP2. It means it is applicable to WCDMA/HSPA from Release 7/8, E-UTRAN (LTE) Release 8, CDMA 2000 and for any future wireless or mobile broadband system that may handle multimedia services.

Adding the new single radio resource assignment message will not require removing existing RRC messages from the 3GPP or 3GPP2 standard that are used in existing mobile systems as WCDMA/HSPA. In addition, it is important to have the same 'logic', one message for bearer handling at the interface between CN and RAN (Iu interface).

With the proposed solution the unique radio resource handling method with a new single radio resource assignment message will provide besides existing messages and procedures, the possibility of less signaling, decreased node and UE processing time, quick RB handling in the RAN, a more robust solution for multi RAB deployment and multi bearer handling and service request from the CN side.

Additionally the solution according to the present invention will provide better RAN performance and KPIs (Key Performance Indices).

The new solution may be of advantage in an evolved QoS strategy where different QoS parameters are handled, such as ARP (Allocation Retention Priority).

Another aspect of the present invention is related to a base station for communication in a wireless communication network comprising a receiver/transmitter combination configured to receive a request for assignment of one or more radio resources over an air interface; a scheduling unit configured to assign one or more radio resources over the air interface; where the base station further comprises means for compiling a single radio resource control message comprising radio resource assignment, release and modification of one or more radio resources over the air interface and for instructing the receiver/transmitter combination to transmit the radio resource control message over the air interface.

One other aspect of the present invention is related to a Mobile terminal for communication in a wireless communication network comprising a receiver/transmitter combination configured to receive a request for assignment of one or more radio resources over an air interface, a control unit configured to examine the assignment request for one or more radio resources over the air interface where the mobile terminal further comprises a processing unit configured to compile a single radio resource control confirmation message comprising confirmation of radio resource assignment, release and modification of one or more radio resources over the air interface where the processing unit is configured to instruct the receiver/transmitter combination to transmit the radio resource control message over the air interface.

It may be added that both the base station and the mobile terminal are adapted to execute the method steps according to the present invention.

Finally, another aspect of the present invention is related to a computer program for radio resource management in a wireless communication network comprising instruction sets for:
receiving a request for assignment of one or more radio resources over an air interface of the wireless communication network via a transport network interface;
transmitting a radio resource assignment message via the air interface of the wireless communication network;
receiving a radio resource assignment confirmation message over the air interface;
transmitting a radio resource assignment confirmation message over a transport network interface and instructions sets for transmitting the radio resource assignment message as a single radio resource assignment message configured to simultaneously affect establishment, release and modification of one or more radio resources provided by the radio access network over the air interface.

BRIEF DESCRIPTION OF THE DRAWINGS

FIGS. 1-3 illustrate in simplified form the signaling between a UTRAN and a UE when handling setup, reconfiguration and release of radio bearers.

DETAILED DESCRIPTION OF PREFERRED EMBODIMENTS

FIGS. 1-3 illustrate signaling between a UE and the UTRAN when handling setup, reconfiguration and release of one radio bearer (RB).

It should be appreciated that these three operations have to be performed in a separate control message and that these operation have to be performed separately for each active RB or for RB's which are to be established between the UTRAN and the UE.

Disadvantages of this signaling have been already mentioned in the description of the background technology and will not be repeated here.

All the above procedures presented in FIGS. 1-3 are capable to add, delete and/or reconfigure transport channels at the MAC level and to reconfigure a physical channel at the same time. Also, all three procedures can either add and reconfigure RBs (at the RLC/PDCP level) or delete and reconfigure RBs or to just reconfigure RBs. But it is not possible to add, release and reconfigure RBs at the same time with the same RRC message.

Figure 4:
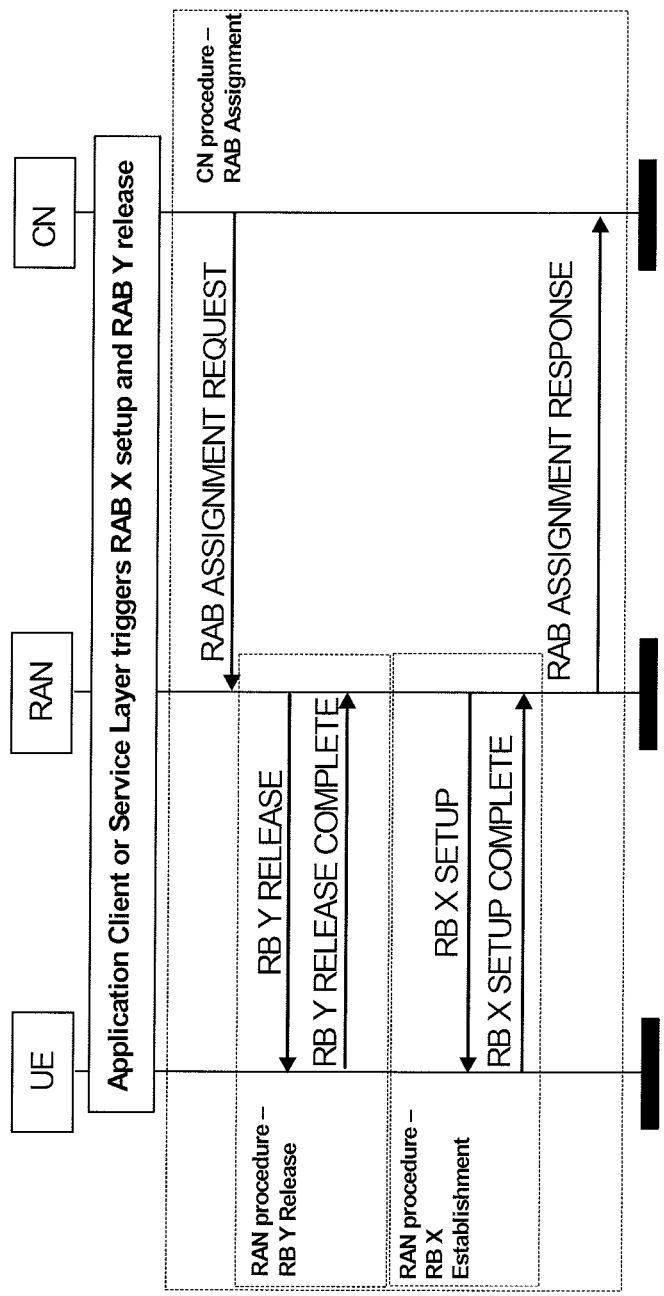
FIG. 4 illustrates the signaling procedure according to known technology for RAB and RB between the UTRAN and the UE in more detail.

FIG. 4 illustrates the known signaling procedure for RAB and RB handling in a wireless communication network according to known technology.

In the figure, two RABs are managed, one RAB called X and the other Y for simplicity. These RABs may be handled either on request from a UE operating in the wireless communication network in FIG. 4 or after being initiated by a data transmission from another UE outside of the network in FIG. 4 towards the UE in FIG. 4.

As is known to the skilled person, RABs are established between the CN and the RAN by transmitting a RAB ASSIGNMENT REQUEST message from the CN to the RAN. This message comprises control signaling for both setup of RAB X and release of RAB Y. Also, RAB handling over the transport network interface, i.e. the interface between the RAN and the CN has a correspondence in RB management over the air interface, i.e. the interface between the RAN and the UE.

RB handling over the air interface is performed on the basis of one message per action meaning that one message can perform one single action on one or more RBs. In known technologies one message can contain the request action for more that one RB. Hence the operation of the original RAB ASSIGNMENT REQUEST message has to be divided into one RB Y RELEASE and one RB SETUP X message as shown in the figure.

Each of these messages has to be confirmed by the UE towards the RAN by transmitting one RB Y RELEASE COMPLETE and one RB X SETUP COMPLETE message, before the RAN can confirm the corresponding RAB assignment as complete by transmitting a RAB ASSIGNMENT RESPONSE message back to the CN. Thereafter data communication between the CN and the UE or between a server outside of the network in FIG. 4 and the UE in FIG. 4 can be established.

Figure 5:
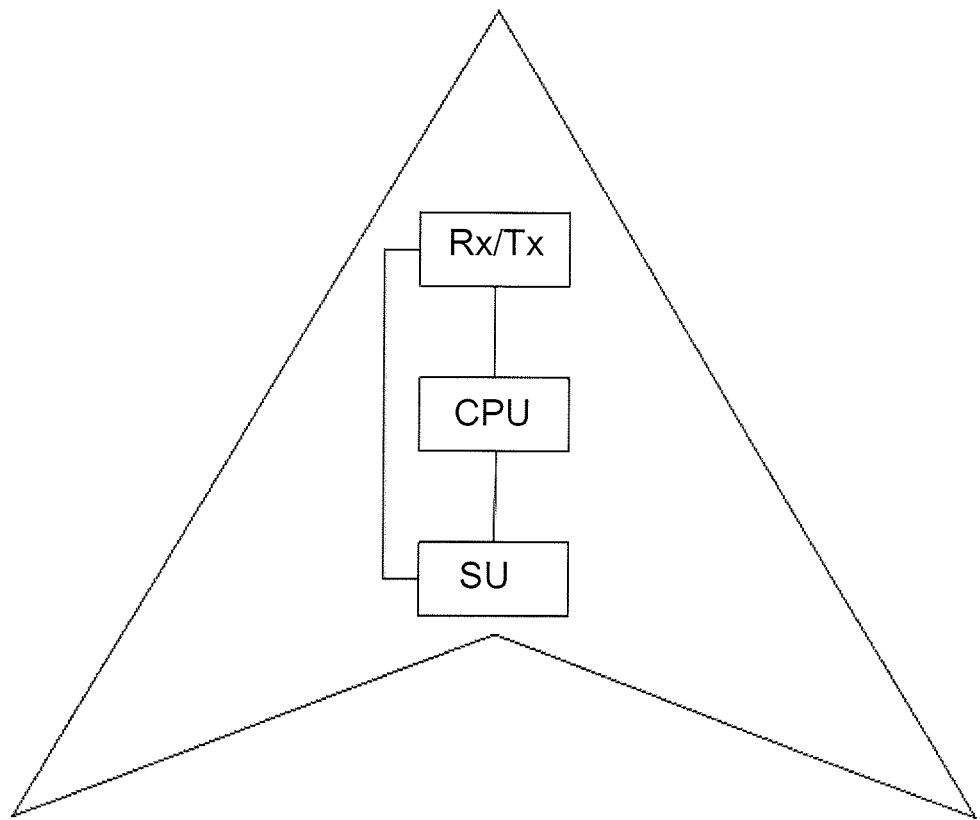
FIG. 5 illustrates a schematic representation of a base station according to one embodiment of the present invention.

Moving now to FIG. 5, an illustration of a base station RBS according to one embodiment of the present invention is shown.

It should be mentioned here that the term base station should be understood very generally, since the base station according to the present invention may be adapted to function in any type of wireless communication network, where there is a base station node, such a base station transceiver, Node B, access point or other base station nodes.

In the embodiment of FIG. 5 the base station RBS comprises a receiver/transmitter combination Rx/Tx, a processing unit CPU and a scheduling unit SU. Although, the base station RBS in FIG. 5 may comprise other units known to exist in a base station, these will be omitted from illustration and explanation, since they do not form part of the present invention.

Additionally it may be remarked that some functionality of the above components of an RBS may equally be implemented in a RAN comprising an RBS and an RNC. Such an example may be scheduling unit SU functionality being partly located in the RNC.

The receiver/transmitter combination Rx/Tx is adapted for receiving and transmitting user and control data over a radio interface towards one or more UEs. Also, the base station is adapted for receiving and transmitting user and control data over the transport network interface towards a core network of the wireless communication network, such as the core network CN in FIG. 4.

Among the control data communicated to and from a UE and a CN the receiver/transmitter combination Rx/Tx is adapted to receive PDP context requests from one or more UEs and to request establishment of one or more (depending on the number of PDP context requests) RABs over the transport network interface (the interface between the RAN and the CN) and one or more corresponding RBs over the air interface towards one or more UEs.

Moreover, the base station RBS in FIG. 5 comprises a processing unit CPU configured to react to incoming PDP context requests by requesting establishment of corresponding RABs over the transport network interface and RBs over the air interface, respectively. As is known to the skilled person, RAB assignment requests for multiple RABs from the CN may be handled in one RAB assignment request message.

Also, the processing unit CPU is configured to react to RAB assignment requests received from the CN by transmitting a single RB assignment message towards the UE via the receiver/transmitter unit Rx/Tx. This message may be network layer control message, such as a modified RRC (Radio Resource Control) message. Compared to solutions suggested by known technology, this single RB assignment message may comprise multiple RB managing operations for several RBs where RB setup, modification and release are performed at the same time for a number of RBs which are either active (here modification and release operations may apply) or to be established (RB setup applies here).

The new processing unit CPU will thus be able to manage a plurality of RBs with reduced signaling and greater efficiency thus providing better performance over the air interface.

Also, the processing unit CPU is configured to instruct a scheduling unit SU in the base station RBS to establish and/or release one or more RBs over the air interface once the processing unit CPU has received an RB assignment complete confirmation message from the UE via the receiver/transmitter unit Rx/Tx.

Also, the processing unit CPU is configured to adjust coding, output power and possible modulation for data to be transported on the one or more established and/or terminated radio bearers RB towards the UE depending on the type of data traffic transported.

Figure 6:
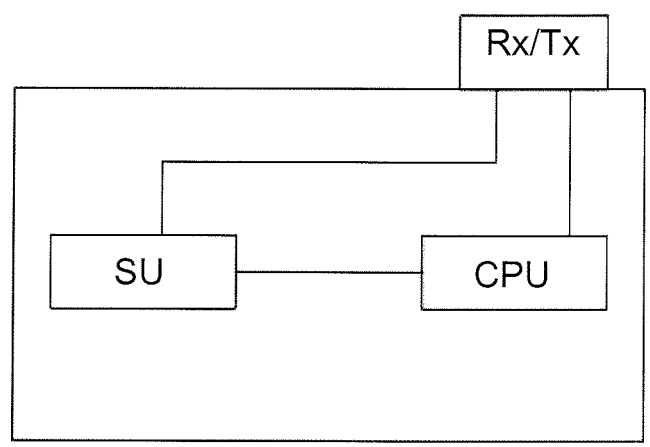
FIG. 6 illustrates a schematic representation of a mobile terminal according to one embodiment of the present invention.

FIG. 6 illustrates a mobile terminal UE according to one embodiment of the present invention. It may be appreciated that the term mobile terminal may comprise cell phones, computer terminals equipped with receiver/transmitter combination in internal or external modules, PDAs and other units adapted for data communication in a wireless communication network.

The mobile terminal UE in FIG. 6 comprises a receiver/transmitter combination Rx/Tx, a processing unit CPU and a control unit CU.

Similar to the receiver/transmitter combination in the base station RBS in FIG. 5, the receiver/transmitter combination Rx/Tx is configured to receive and transmit user and control data via the air interface. Among the control data transmitted, the receiver/transmitter unit Rx/Tx may transmit service and PDP context requests to a base station and also control messages related to RB handling.

Connected to the receiver/transmitter combination Rx/Tx is a processing unit CPU adapted to receive control messages related to RB handling from a base station, such as the base station RBS from FIG. 5 and to confirm setup, modification and release of a plurality of RBs in one single RB assignment control confirmation message. Analogously to the RB assignment control message performing multiple RB management operations in one single message, this new RB assignment control confirmation message may confirm the operations requested in the RB assignment control message in a single message. Hence, signaling over the radio interface may be reduced leading to a more efficient utilization of available radio resources compared to solutions suggested by known technology. As already mentioned for the RB assignment control message transmitted by the base station RBS in FIG. 5, this control confirmation message may be transmitted via the network layer as an RRC confirmation message.

Moreover, the processing unit CPU of the mobile terminal UE in FIG. 6 may instruct the control unit SU to adapt coding and modulation to the data on the RBs established or modified after it has transmitted the RB assignment confirmation control message to the base station.

Next, the signaling procedure according to one embodiment of the present invention will be explained referring to FIG. 7.

Here, the example case identical to the scenario in FIG. 4 is taken where one RAB (X) is set up and another RAB (Y) is released which may be triggered by an application client in the UE or by the service layer in the CN.

If the RAB setup and release is triggered by the application client in the UE, this may be indicated by a PDP context request (not shown) transmitted by the UE via the RAN towards the CN, establishing a new PDP context and possibly modification of the existing PDP context. The reason for UE initiated RAB X setup and RAB Y release may be the request of a new service from the application client of the UE or the termination of a service used by the application client.

Thereafter, the CN may, as is known to the skilled person and shown in FIG. 4, transmit a RAB ASSIGNMENT REQUEST message comprising requests for setting up of a new RAB, namely RAB X and the release of an existing RAB, RAB Y. The RAB ASSIGNMENT REQUEST message may be transmitted by the CN to the RAN as a reaction to an application client initiated PDP context request and modify PDP context message. In the next step, the RAN transmits a single RB ASSIGNMENT message comprising a corresponding RB setup and release request, where a new RB X corresponding to the new RAB X is set up and where the corresponding RB Y is released. Using the single RB ASSIGNMENT message operations such as setup, modification and release may be performed on many RBs, which would reduce signaling over the air interface without the need for modification of the existing signaling process in a wireless communication network, where each of these operations has to be handled by a separate control message over the air interface. Also, the new RB ASSIGNMENT message is compatible with existing RB setup, modification and release messages in a wireless communication network, since it works both with one RB operation and with operations on many RB at the same time.

Figure 7:
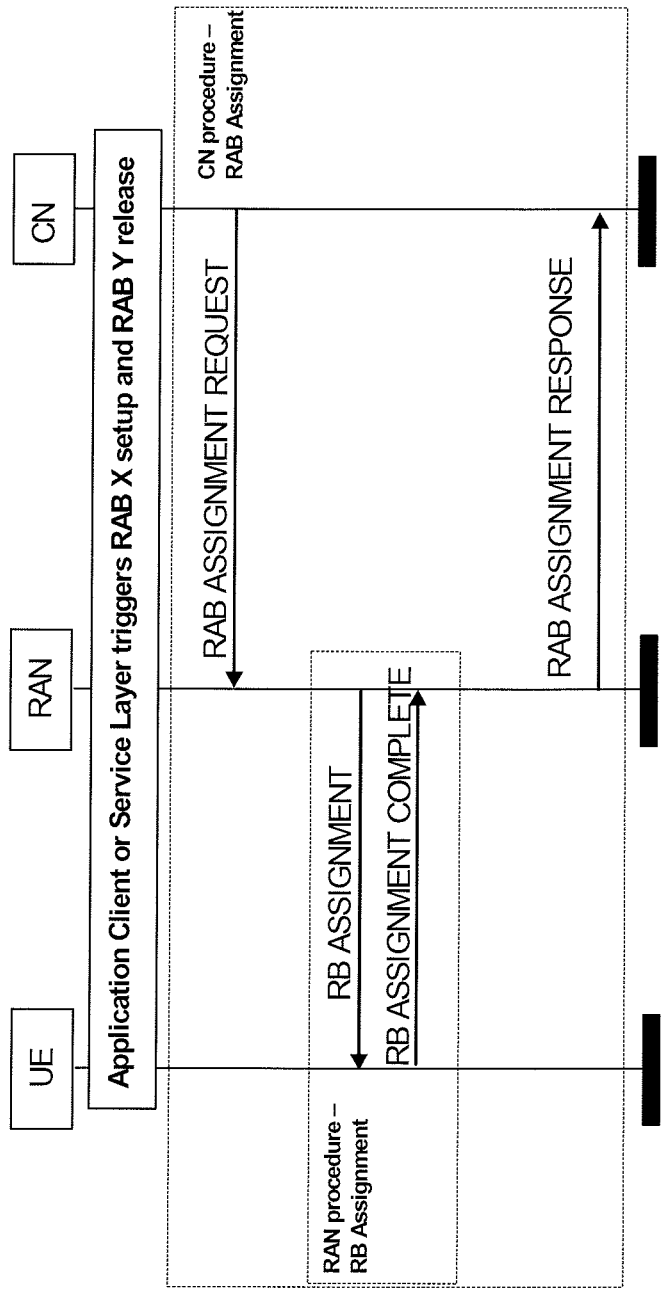
FIG. 7 illustrates the signaling procedure for RAB and RB between the UTRAN and the UE according to one embodiment of the present invention.

This scenario in FIG. 7 is thus valid when the deployment of supported multi RAB configurations is not optimized in the RAN. The benefits of the solution are improved KPIs regarding accessibility of high priority RABs with less amount signaling, a more flexible RAN procedure and better RAN performance.

The proposed new solution in RRC and RANAP/S1AP protocols is valid for 3GPP specifications as 25.331 and 36.413 but also the logic needs to be applicable for other mobile and wireless systems and specifications (as e.g. in 3GPP2, IEEE 802.xxx etc). It should be borne in mind that the new solution does not exclude the application of existing RRC/S1AP messages in the existing standard or system versions. But it will benefit mobile/wireless broadband systems to have only one standardized RAN procedure and one standardized unique radio bearer message that will be used to setup, release and reconfigure one or more radio bearer(s) as suggested by the present invention.

In the multimedia world where multiple services, multiple APNs and PDP contexts and where an IMS architecture and evolved QoS strategy in CN and RAN is applied, it will become important to support service interactions from top, application clients in UE and service layers via different CN entities, down to RAN and UEs. The deployment of multi RAB/RB configurations and its handling and signaling via different RAN entities towards UEs is gaining momentum and it will be crucial for future radio access networks.

At the same time, new radio access technologies will provide high throughput over the radio interface with possibility to handle longer radio control L3 messages.

Due to above facts, the advantages of the invention are less signaling over the air interface and the transport network interface and reduced processing time in the UE. Moreover, the present invention introduces a faster, more flexible and unified procedure and function for the radio access part of a wireless communication network which is more aligned with an overall QoS strategy in the radio access part of the network. (e.g. using ARP in RAB/RB handling). Also it leads to increased efficiency in the radio access network.

The reduced need of signaling for handling of RB setup, modification and release operations also leads to better performance, because of the reduced time needed for these operations and improved KPIs regarding the improvement related to lower probability of exceptional cases and RAB integrity (retainability), i.e. to keeping existing RABs or calls during ordered RAB release procedures.

At the same time, the present solution reduces the costs in the deployment of multi RAB configurations and their handling.

Finally, the solution according to the present invention is backward compatible and will not impact legacy networks and UE, which can still operate according to the scheme one RB handling message per bearer.

The invention claimed is:

1. A method for radio resource handling in a wireless communication network comprising:
   receiving from a core network, at a radio access network (RAN), via a transport network interface a request for assignment of radio resources over an air interface of the wireless communication network;
   scheduling assignment of the radio resources over the air interface;
   transmitting via the air interface, from the RAN to a mobile terminal, a radio resource assignment message for the radio resources in the wireless communication network;
   receiving from the mobile terminal at the RAN a radio resource assignment confirmation message over the air interface; and
   transmitting from the RAN to the core network a radio resource assignment confirmation response message over the transport network interface,
   wherein the radio resource assignment message transmitted via the air interface comprises a single radio resource assignment message configured to simultaneously request performance of establishment, release and modification of the radio resources provided by the air interface, and
   wherein the radio resource assignment confirmation message received at the RAN comprises a single radio resource control confirmation message configured to confirm the radio resource assignment that simultaneously requested the performance of the establishment, release and modification of the radio resources.

2. The method according to claim 1, wherein the transport network interface comprises an Iu-interface in a third generation wireless communication network.

3. The method according to claim 1, wherein the air interface comprises a Uu-interface in a third generation wireless communication network.

4. The method according to claim 1, wherein the radio resources comprise radio bearers (RBs).

5. The method according to claim 1, wherein the radio resource assignment message transmitted over the air interface comprises a single radio resource control (RRC)-message issued at the network level of the OSI (Open Systems Interconnect)-model.

6. The method according to claim 1, wherein the wireless communication network comprises one of UMTS (Universal Mobile Telephony System), WCDMA (Wideband Carrier Division Multiple Access) and 3GPP LTE (Third Generation Partnership Project Long Term Evolution).

7. A base station for communication in a wireless communication network, the base station comprising:
- a receiver/transmitter combination configured to receive from a core network via a transport network interface a request for assignment of radio resources over an air interface;
- a scheduling unit configured to assign the radio resources over the air interface; and
- a processing unit configured to compile a single radio resource assignment message configured to simultaneously request performance of establishment, release and modification of the radio resources over the air interface and to instruct the receiver/transmitter combination to transmit the radio resource assignment message over the air interface to a mobile terminal,
- wherein the receiver/transmitter combination is further configured to receive from the mobile terminal a radio resource assignment confirmation message,
- wherein the receiver/transmitter combination is further configured to transmit via the transport network interface to the core network a radio resource assignment confirmation response message, and
- wherein the radio resource assignment confirmation message comprises a single radio resource control confirmation message configured to simultaneously confirm the establishment, release and modification of the radio resources requested in the radio resource assignment message.

8. A non-transitory computer readable storage medium for radio resource management in a base station of a wireless communication network, the non-transitory computer readable storage medium comprising instruction sets configured to:
- receive, from a core network via a transport network interface, a request for assignment of radio resources over an air interface of the wireless communication network;
- schedule assignment of the radio resources over the air interface;
- transmit a radio resource assignment message to a mobile terminal via the air interface of the wireless communication network;
- receive, from the mobile terminal, a radio resource assignment confirmation message over the air interface;
- transmit, to the core network, a radio resource assignment confirmation response message over the transport network interface,
- wherein the radio resource assignment message is transmitted as a single radio resource assignment message configured to simultaneously request performance of establishment, release and modification of the radio resources provided by a radio access network over the air interface, and
- wherein the radio resource assignment confirmation message received from the mobile terminal over the air interface is configured to simultaneously confirm the establishment, release and modification of the radio resources requested in the radio resource assignment message.

9. The base station according to claim 7, wherein the air interface comprises a Uu-interface in a third generation wireless communication network.

10. The base station according to claim 7, wherein the radio resource assignment message transmitted over the air interface comprises a single radio resource control (RRC)-message issued at the network level of the OSI (Open Systems Interconnect)-model.

11. The base station according to claim 7, wherein the air interface comprises a Uu-interface in a third generation wireless communication network.

12. The base station according to claim 7, wherein the radio resource assignment message transmitted over the air interface comprises a single radio resource control (RRC)-message issued at the network level of the OSI (Open Systems Interconnect)-model.

13. The non-transitory computer readable storage medium according to claim 8, wherein the air interface comprises a Uu-interface in a third generation wireless communication network.

14. The non-transitory computer readable storage medium according to claim 8, wherein the radio resource assignment message transmitted over the air interface comprises a single radio resource control (RRC)-message issued at the network level of the OSI (Open Systems Interconnect)-model.

15. A mobile terminal for communication in a wireless communication network, the mobile terminal comprising:
- a receiver/transmitter combination configured to receive from a radio access network (RAN) a radio resource assignment message for radio resources in the wireless communication network over an air interface, wherein the radio resource assignment message is a single radio resource assignment message configured to simultaneously request performance of establishment, release and modification of the radio resources over the air interface;
- a control unit configured to examine the radio resource assignment message for the radio resources over the air interface; and
- a processing unit configured to compile a single radio resource assignment confirmation message configured to simultaneously confirm the establishment, release and modification of the radio resources requested in the radio resource assignment message;
- wherein the receiver/transmitter combination is further configured to transmit to the RAN the single radio resource assignment confirmation message that was compiled.

16. A method for radio resource handling in a wireless communication network comprising:
- receiving at a mobile terminal from a radio access network (RAN) via an air interface, a radio resource assignment message for radio resources in the wireless communication network,
- wherein the radio resource assignment message is a single radio resource assignment message configured to simultaneously request performance of establishment, release and modification of the radio resources over the air interface;
- examining the radio resource assignment message for the radio resources over the air interface;
- compiling a single radio resource assignment confirmation message configured to simultaneously confirm the establishment, release and modification of the radio resources requested in the radio resource assignment message; and transmitting to the RAN the single radio resource assignment confirmation message that was compiled.

\* \* \* \* \*